United States Patent Office.

HIRAM L. WILCOX, OF PERCIVAL, IOWA.

Letters Patent No. 91,504, dated June 15, 1869.

IMPROVED PROCESS OF TANNING HIDES.

The Schedule referred to in these Letters Patent and making part of the same.

*To all whom it may concern:*

Be it known that I, HIRAM L. WILCOX, of Percival, Fremont county, in the State of Iowa, have invented a new and improved Process for Tanning Hides; and I hereby declare the following to be a full and exact description thereof.

The nature or essence of my invention consists in a process for tanning hides, hereinafter fully set forth, and in the application or use, in tanning hides, of the plant, water persicaria—the *Polygonum amphibium*, variety *terrestre*, of Gray.

My process for tanning hides consists essentially of the following steps:

I first extract, by boiling in water, the tanning-principle, or tannin, contained in the plant, water persicaria, or amphibious knot-grass, (*Polygonum amphibium*, variety *terrestre*, Gray,) the proper strength of liquor for fresh hides being obtained from the proportion of about four gallons of water to one pound of the top and root of the plant, but after the hides are partially tanned, the strength of the decoction may be safely increased.

The hides are placed in this liquor, in a suitable vat or tub, and properly handled from time to time, so as to give it free access to all the parts, until they are from one-half to three-fourths tanned, when they are to be put into a finishing-liquor, prepared as follows:

In one hundred gallons of a strong decoction of the plant above described, dissolve ten pounds of alum, five pounds of Glauber salts, and two and a half pounds of sal-soda; heat the solution to 100° Fahrenheit; and add one pound of sulphuric acid; mix thoroughly; then put the hides, partially tanned as above, into this liquor, and handle them every two or three days, adding, each time, from five to ten gallons of a fresh decoction of the aforesaid plant, and in from five to twenty days, according to the thickness of the hides, and the strength of the decoction employed, they will be found to be completely tanned.

The *Polygonum amphibium* is found in abundance in Iowa and other western States, and can be obtained at about half the expense of bark required to produce the same effect.

To aid in tanning, but more particularly to give a better color to the leather, I commonly combine the leaf and stalk of the native sumach (*Rhus glabrum*, &c.,) with the persicaria, in the proportion of about one-fourth sumach to three-fourths of the other plant.

For convenience in obtaining a decoction of the plant or plants, I arrange two or more boilers, one above another, so as to draw out always from the lowest, and from the higher into the lower, taking also the refuse plant from the highest, moving that in the lower boiler into the higher, and charging the lowest, each time, with a fresh supply of the plant.

What I claim as my invention, and desire to secure by Letters Patent, is—

The above-described process for tanning hides, substantially as herein set forth.

HIRAM L. WILCOX.

Witnesses:
C. W. SEYMOUR,
JAMES REED.